(12) United States Patent
Johann et al.

(10) Patent No.: US 11,459,126 B2
(45) Date of Patent: Oct. 4, 2022

(54) RECONNAISSANCE ROVER DESIGNED FOR MULTIPLE AGILE AND AUTONOMOUS LANDINGS OVER A SMALL BODY OR MOON

(71) Applicant: Airbus Defence and Space GmbH, Taufkirchen (DE)

(72) Inventors: Ulrich Johann, Salem (DE); Albert Falke, Friedrichshafen (DE); Tobias Ziegler, Constance (DE); Simon Delchambre, Constance (DE); Franz Georg Hey, Weingarten (DE)

(*) Notice: Subject to any disclaimer, the term of this patent is extended or adjusted under 35 U.S.C. 154(b) by 241 days.

(21) Appl. No.: 16/646,053

(22) PCT Filed: Aug. 24, 2018

(86) PCT No.: PCT/EP2018/072883
§ 371 (c)(1),
(2) Date: Mar. 10, 2020

(87) PCT Pub. No.: WO2019/048262
PCT Pub. Date: Mar. 14, 2019

(65) Prior Publication Data
US 2021/0101701 A1    Apr. 8, 2021

(30) Foreign Application Priority Data

Sep. 11, 2017  (DE) .......................... 102017120911.5
Jul. 18, 2018  (EP) ..................................... 18184086

(51) Int. Cl.
*B64G 1/10*  (2006.01)
*B64G 1/24*  (2006.01)
(Continued)

(52) U.S. Cl.
CPC ............. *B64G 1/105* (2013.01); *B64G 1/242* (2013.01); *B64G 1/40* (2013.01); *B64G 1/425* (2013.01);
(Continued)

(58) Field of Classification Search
CPC .......... B64G 1/105; B64G 1/242; B64G 1/40; B64G 1/425; B64G 1/428; B64G 1/44;
(Continued)

(56) References Cited

U.S. PATENT DOCUMENTS 5,397,082 A * 3/1995 Scott ...................... B64G 1/105
                                                            244/158.4
5,566,909 A * 10/1996 Lapins ................... B64G 1/105
                                                            244/63
(Continued)

FOREIGN PATENT DOCUMENTS

CN    102981507 A  *  3/2013
CN    102981507 A     3/2013
(Continued)

OTHER PUBLICATIONS

2017 IEEE Aerospace Conference Digest—Yellowstone Conference Center, Big Sky, Montana, Mar. 4-11, 2017, Conference Digest (Year: 2017).*
(Continued)

*Primary Examiner* — Behrang Badii
*Assistant Examiner* — Jalal C Coduroglu
(74) *Attorney, Agent, or Firm* — Greer, Burns & Crain, Ltd.

(57) ABSTRACT

A reconnaissance rover configured for multiple agile and autonomous landings over a small body or moon. The reconnaissance rover comprises a detection unit, a processing unit, a control unit and a drive unit. The detection unit is configured to detect at least an environment in front of the
(Continued)

reconnaissance rover, in the direction of a trajectory of the reconnaissance rover over a surface of the small body or moon. The detection unit is further configured to provide environmental data based on the detected environment. The processing unit is configured to update the trajectory based upon the provided environmental data. The control unit interacts with the drive unit to move the reconnaissance rover according to the updated trajectory.

16 Claims, 2 Drawing Sheets

(51) Int. Cl.
  *B64G 1/40* (2006.01)
  *B64G 1/42* (2006.01)
  *B64G 1/44* (2006.01)
  *B64G 1/66* (2006.01)
  *G01C 21/24* (2006.01)

(52) U.S. Cl.
  CPC .............. *B64G 1/428* (2013.01); *B64G 1/44* (2013.01); *B64G 1/66* (2013.01); *G01C 21/24* (2013.01); *B64G 2001/1071* (2013.01)

(58) Field of Classification Search
  CPC .... B64G 1/66; B64G 2001/1071; B64G 1/62; G01C 21/24
  See application file for complete search history.

(56) References Cited

U.S. PATENT DOCUMENTS

| | | | | |
|---|---|---|---|---|
| 6,219,185 | B1* | 4/2001 | Hyde | B64G 1/285 359/565 |
| 6,409,125 | B1* | 6/2002 | Jorck | B64G 1/1021 244/171 |
| 7,631,839 | B1* | 12/2009 | Duncan | B64G 1/105 244/158.1 |
| 8,296,120 | B2* | 10/2012 | Phillips | G06F 30/34 703/16 |
| 8,594,866 | B1* | 11/2013 | Chen | B60L 58/30 701/21 |
| 8,640,994 | B1* | 2/2014 | Cosner | B64G 1/285 244/173.1 |
| 9,266,627 | B1* | 2/2016 | Anderson | B64G 1/66 |
| 9,563,203 | B2* | 2/2017 | Davoodi | B63G 8/001 |
| 10,800,548 | B2* | 10/2020 | Wang | B64C 39/024 |
| 2002/0049517 | A1* | 4/2002 | Ruffner | B60L 50/40 701/1 |
| 2002/0049521 | A1* | 4/2002 | Ruffner | B60L 3/106 701/23 |
| 2002/0049522 | A1* | 4/2002 | Ruffner | B60L 1/003 318/587 |
| 2004/0124312 | A1* | 7/2004 | Mueller | B64G 1/105 244/150 |
| 2005/0113987 | A1* | 5/2005 | Fink | G05D 1/0038 701/21 |
| 2006/0229801 | A1* | 10/2006 | Fink | G05D 1/0297 701/117 |
| 2008/0023587 | A1* | 1/2008 | Head | G01C 21/24 244/171.1 |
| 2009/0206204 | A1* | 8/2009 | Rosen | B64G 1/242 244/158.5 |
| 2009/0276110 | A1* | 11/2009 | Martinez | G05D 1/0038 701/23 |
| 2011/0302078 | A1* | 12/2011 | Failing | H02J 50/90 700/297 |
| 2014/0017992 | A1* | 1/2014 | Bigras | B64G 1/1085 455/12.1 |
| 2015/0102173 | A1* | 4/2015 | Evkersley | B64G 1/242 244/158.4 |
| 2015/0120126 | A1* | 4/2015 | So | G05D 1/104 701/26 |
| 2017/0073087 | A1* | 3/2017 | Clagett | B64G 1/425 |
| 2017/0253352 | A1* | 9/2017 | Ducarne | F16M 13/02 |

FOREIGN PATENT DOCUMENTS

| | | | | |
|---|---|---|---|---|
| CN | 103318428 | A * | 9/2013 | ............ F16L 55/48 |
| CN | 203366625 | U * | 12/2013 | ............ B64G 1/242 |
| CN | 104494845 | A * | 4/2015 | |
| CN | 104494845 | A | 4/2015 | |
| DE | 102004036980 | A1 * | 2/2005 | ............ F16L 55/48 |
| JP | 2017071395 | A * | 4/2017 | ............ B60L 53/65 |
| RU | 2291808 | C2 * | 1/2007 | |
| RU | 2388639 | C1 * | 5/2010 | |
| WO | 2009094603 | A2 | 7/2009 | |
| WO | WO-2009094603 | A2 * | 7/2009 | ............ B64G 1/242 |

OTHER PUBLICATIONS

Dissertation—Vision-Based Hazard Estimation During Autonomous Lunar Landing—Eleanor S. Crane—Jun. 2, 2014 (Year: 2014).*

Dissertation—Vision-Based Control and Coordination of Unmanned Vehicles—Omid Shakernia—Fall 2003 (Year: 2003).*

National Aeronautics and Space Administration—Entry, Descent, and Landing Roadmap Mark Adler; Michael Wright; Charles Campbell; Ian Clark; Walt Engelund; Tommaso Rivellini Apr. 2012 (Year: 2012).*

European Search Report; priority document.

International Search Report; priority document.

German Office Action for corresponding German Patent Application No. 102017120911.5 dated May 16, 2019.

Rosetta Rendezvous Mission with Comen 67P/Churyumov-Gerasimenko, dated May 16, 2019, 110 pages.

* cited by examiner

RECONNAISSANCE ROVER DESIGNED FOR MULTIPLE AGILE AND AUTONOMOUS LANDINGS OVER A SMALL BODY OR MOON

CROSS-REFERENCES TO RELATED APPLICATIONS

This application claims the benefit of the International Application No. PCT/EP2018/072883, filed on Aug. 24, 2018, and of the European patent application No. 18184086.9 filed on Jul. 18, 2018, and of the German patent application No. 10 2017 120 911.5 filed on Sep. 11, 2017, the entire disclosures of which are incorporated herein by way of reference.

BACKGROUND OF THE INVENTION

The present disclosure relates to a reconnaissance rover designed for multiple agile and autonomous landings over a small body or moon.

To date there are no known designs for missions over small bodies and moons with weak gravitational forces. Small bodies of the solar system in this context are rotating or tumbling objects without atmosphere, whose extremely weak gravitational conditions render safe, agile operation on the surface more difficult or impossible, as even the smallest faults or disturbances may result in loss of the mission. This also includes unsupervised lowering from landing vehicles.

SUMMARY OF THE INVENTION

Therefore, an object of the present disclosure is to provide a mobile reconnaissance rover capable of multiple landings, distributed above the surface, for this class of small bodies (comets, asteroids, NEO's, small moons, rock fragments).

According to one aspect, a reconnaissance rover designed for multiple agile and autonomous landings over a small body or moon is provided. The reconnaissance rover comprises a detection unit, a processing unit, a control unit and a drive unit. The detection unit is designed to detect at least an environment in front of the reconnaissance rover, in the direction of a trajectory of the reconnaissance rover over a surface of the small body or moon. The detection unit is designed to provide environmental data based on the detected environment. The processing unit is designed to update the trajectory based on the provided environmental data. The control unit is designed to interact with the drive unit in order to move the reconnaissance rover according to the updated trajectory.

The term "move" can also be understood as "flying" or "controlled movement".

The processing unit can also be designed to update the trajectory, taking Coriolis forces into account.

The reconnaissance rover can be designed for agile and autonomous operation. In addition, the reconnaissance rover can be a levitating prospector for small bodies in the solar system, which is also designed for multiple landing.

The reconnaissance rover can also be a lander, or referred to as such.

The reconnaissance rover is preferably applied in the exploration and discovery of the solar system, its discovery and its development. In addition, a further object is to use the reconnaissance rover to obtain further information about the origins of life and to research the activity of the small body, in particular a comet. By means of a direct investigation on the surface of the small body and the ability to move along the surface of the small body, better scientific conclusions can be drawn. In addition, by a combination of "close-range exploration" in a levitation phase and in-situ exploration of selected landing positions distributed over the surface, the reconnaissance rover enables information to be gathered about the composition and distribution of materials. As a result, the reconnaissance rover can be used, in particular, for commercial applications as a prospector for mineral resources on small bodies and moons in the solar system.

The small body can be an asteroid or comet. The reconnaissance rover can be a landing-enabled spacecraft. The reconnaissance rover can be a hard or soft lander. Over at least part of the trajectory the reconnaissance rover can be a distance apart from the surface of the small body or moon. The drive unit can be, for example, a non-stiction-based drive unit. The reconnaissance rover can move without the assistance of static friction, for example.

The expression "over a surface" can be understood here to mean "above a surface", which makes it clear that the trajectory is not located directly on the surface and that the reconnaissance rover does not move on the surface.

The term "fly" here can include "hovering" or a "hovering locomotion". The flight can also include a parabolic flight, for example, unpowered, between landing positions. For example, the parabolic flight includes an orbital trajectory.

The drive unit can also be designed to be operated in a vacuum.

The updated trajectory can be a polygonal chain. The reconnaissance rover can be designed to perform a rotation in a horizontal plane of the reconnaissance rover at a point in the polygonal chain, in order to align itself according to the polygonal path following the point. The reconnaissance rover can be designed to perform a rotation in the horizontal plane of the reconnaissance rover at the point of the polygonal chain in order to move along the polygonal path following the point after the rotation.

The drive unit can also be designed to apply forces which are in a range between 1N and 10-6 N, for example also 10-4 N and 10-6 N, in order to hold the reconnaissance rover, for example, in a hovering state above the surface. The holding can last for a period from 1 minute to 1 hour. This can be carried out at points where a gravity vector differs from a local surface normal, e.g., at a steep face or hole of the small body or moon.

The drive unit can also be designed to adjust a speed of the reconnaissance rover relative to the small body or moon, in order to move the reconnaissance rover along the updated trajectory. A solar pressure of a sun, local Coriolis forces and/or unexpected gravitational anomalies can be taken into account when adjusting the speed.

The detection unit may also be designed to detect a relative distance of a current position of the reconnaissance rover from the surface of the small body or moon. The detection unit may also be designed to provide the relative distance to the processing unit. The detection unit may also be designed to detect lateral relative movements of the reconnaissance rover with respect to the local surface of the small body or moon and provide them to the processing unit. The processing unit can be designed to provide a target speed to the control unit corresponding to the relative distance and/or the lateral relative movement. The control unit can be designed to interact with the drive unit in order to move the reconnaissance rover according to the updated trajectory.

The reconnaissance rover may also comprise an acceleration sensor. The acceleration sensor can be designed to measure an acceleration of the reconnaissance rover. The processing unit can be designed to provide the control unit with a speed necessary for tracking the updated trajectory based on the measured acceleration.

The processing unit can be designed, based on a gravitational force module of the small body or moon, to take into account a maximum velocity relative to the small body or moon which the reconnaissance rover must not exceed when updating the trajectory. In addition, the processing unit can be designed, based on a gravitational force module of the small body or moon, to take into account a minimum velocity relative to the small body or moon which the reconnaissance rover must not fall below, when updating the trajectory.

The processing unit can also be designed to take into account that along the trajectory only torque values of less than 10-2 Nm occur in a direction facing towards or away from a center of gravity of the small body or moon when updating the trajectory.

The reconnaissance rover can comprise an energy supply system. The energy supply system can comprise an energy storage device. The energy supply system can comprise an energy supply device. The energy supply system can be designed to supply energy to the drive unit.

The energy supply device can be designed to supply the energy storage device and the drive unit with energy when solar radiation from a sun is present.

The energy storage device can be designed to supply the drive unit with energy in case no solar radiation from a sun is present.

The energy storage device can be designed to supply the drive unit with energy together with the energy supply device, when a supply voltage delivered by the energy supply device falls below a threshold value. The threshold value can identify a minimum supply voltage of the drive unit.

The processing unit can be designed, when updating the trajectory, to take into account the fact that a landing position for the reconnaissance rover at the end of the updated trajectory on a surface of the small body or moon has a line-of-sight connection to a sun, in order to supply the energy supply device with energy by radiation from the sun. The processing unit can also be designed, when updating the trajectory, to take into account the fact that a landing position for the reconnaissance rover underneath the updated trajectory on a surface of the small body or moon has a line-of-sight connection to a sun, in order to supply the energy supply device with energy by radiation from the sun.

The energy supply device can be designed to supply the energy storage unit with energy. The energy storage unit can be designed to be supplied with energy from the energy supply device.

The energy supply system has, for example, only unidirectional electrical connections.

A hovering of the reconnaissance rover can be achieved by adjustment of a repulsion force based on an acceleration vector, acceleration module and/or gravitational force module of the small body.

The hovering may also be adjusted by way of a hovering condition. The hovering condition can comprise a minimum velocity and a maximum velocity along the trajectory. The minimum velocity and the maximum velocity can define a range in which the reconnaissance rover is not repelled by or does not escape the small body.

The hovering, as well as liftoff and landing, can be supported in the immediate vicinity of the ground by suitable operation of the drive unit, for example by electrical propulsion units or induced electrostatic forces between the surface of the small body or moon and the reconnaissance rover.

BRIEF DESCRIPTION OF THE DRAWINGS

Further objectives, features, advantages and application possibilities arise from the following description of exemplary embodiments, which are not to be understood as limiting, with reference to the corresponding schematic drawings.

DETAILED DESCRIPTION OF THE PREFERRED EMBODIMENTS

Figure 1:
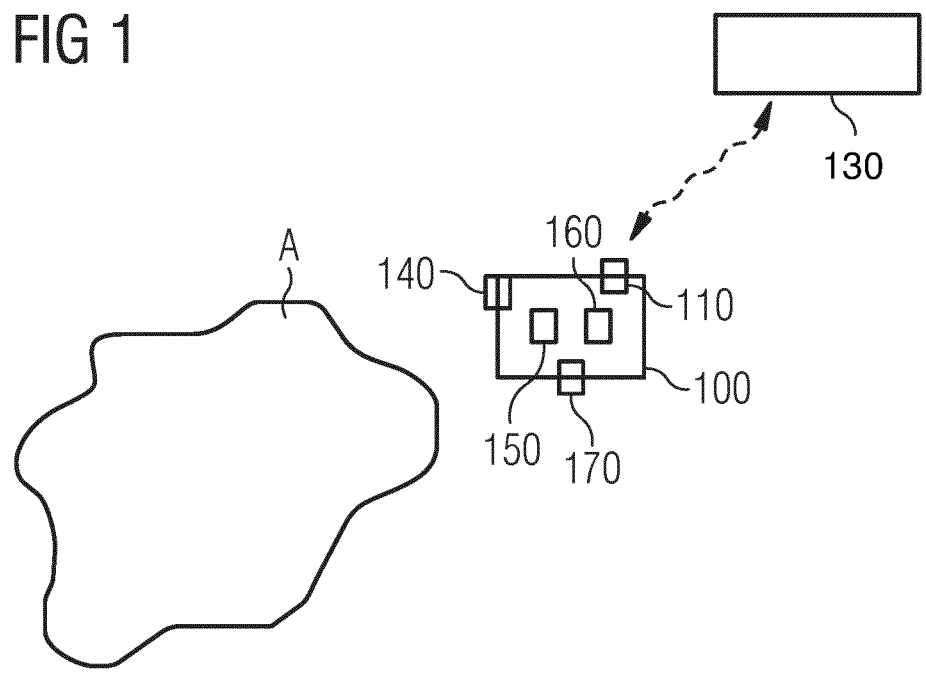
FIG. 1 shows a schematic view of an application of the present disclosure.

In the figures, corresponding or functionally similar components are labelled with the same reference symbols. The reconnaissance rover according to the invention is now described on the basis of exemplary embodiments.

Usually, in the case of small bodies such as asteroids and comets, the gravitational forces in terms of an acceleration are in the range of 10-6 and 10-4 m/s2. This means that landing vehicles fitted with rollers are not suitable for landing on small bodies. This applies to both hard and soft reconnaissance rovers.

Therefore, the present disclosure provides a reconnaissance rover which is designed to hover at low altitude above the small body, in order to gain a better understanding of the shape, size, density and the spin rate of the small body. The reconnaissance rover comprises an active GNC system for autonomous hovering maneuvers based on a collision avoidance algorithm.

For landing and flight maneuvers, in accordance with this disclosure two different mission architectures are possible, namely a single reconnaissance rover without orbiter (1st option) or a reconnaissance rover with orbiter (2nd option). The powertrain necessary for the reconnaissance rover for forward movement and for transferring the reconnaissance rover can comprise a chemical and/or electrical drive. The drive used for hovering in both options can be an electric drive, a cold gas drive, a hybrid-fuel drive, an electrostatic drive or a combination of some or all of these drives.

For communication with a base station near to the earth or on the earth, in the first option a direct link between the earth and the reconnaissance rover is required. For the second option a direct link between the earth and the reconnaissance rover can be provided. For the second option, however, the orbiter can also be used, e.g., as a repeater, to forward the signal originating from the earth to the reconnaissance rover or to forward the signal originating from the reconnaissance rover to the base station. A power supply system required for the reconnaissance rover for the first option can comprise a combination of removable and/or insertable solar panels and batteries. For the second option, the power supply system for the reconnaissance rover can comprise a combination of batteries and either removable and insertable solar panels, or solar panels mounted on the reconnaissance rover.

With regard to the second option, the orbiter can be provided to carry the reconnaissance rover into the vicinity of the small body and let it go above the small body. As a result, the reconnaissance rover can be produced in a simpler design and energy for supplying power to the drive can be saved.

On the basis of an acceleration vector, an acceleration module and/or a gravitational force module of the small body, a repulsion force can be set that corresponds to the effective gravitational force. As a result of this, the reconnaissance rover can reach the hovering state. An effective gravitational vector in this case is given by $$\vec{g}_{eff} = \vec{g} - \vec{\omega} \times [\vec{\omega} \times \vec{r}]$$ (Equation 1)

where geff is the effective gravitational vector, g is the gravitational vector of the small body, ω the angular velocity of the small body, and r the direction vector to a point on the surface.

A hovering condition can also be constructed which can be identified by a region, the borders of which mark the area in which no escape from the small body by the reconnaissance rover occurs. The hovering condition can be given via an escape condition:

$$v_l \geq \sqrt{U(r)}$$ (Equation 2)

In addition, the hovering condition can be given by:

$$M = \left(1 - \frac{v_l}{\sqrt{U(r)}}\right)$$ (Equation 3)

wherein $$\vec{v}_l = \vec{v}_{rel} + \vec{\omega} \times \vec{r}$$ (Equation 4)

Thus, assuming a maximum relative velocity of 0.15 m/s the hovering condition can be between 0.35 and 0.85.

FIG. 1 shows both the first option and the second option. To illustrate the first option, a reconnaissance rover 100 with an energy supply system 110 is shown. For communication, a transmitting and receiving device with an additional processing unit (not shown) can be provided. The second option also illustrated in FIG. 1 provides that the communication takes place via an orbiter 130. In this case, the orbiter 130 can be equipped with a more powerful repeater in order to ensure robust communication. The orbiter 130 can additionally ensure a stable communication if the reconnaissance rover 100 is located on a side of a small body A facing away from the earth. The small body A in this case is a comet or asteroid. In accordance with both options, the reconnaissance rover 100 in FIG. 1 comprises a detection unit 140, or detector, a processing unit 150, or processor, a control unit 160, or controller, and a drive unit 170, or driver.

The detection unit 140 is configured to detect at least one environment in front of the reconnaissance rover in the direction of a trajectory of the reconnaissance rover 100 above a surface of the small body or moon (A). The detection unit 140 is configured to provide environmental data based on the detected environment. The processing unit 150 is configured to update the trajectory based on the provided environmental data. The control unit 160 interacts with the drive unit 170 in order to move the reconnaissance rover according to the updated trajectory. The control unit 160 and the processing unit 150 can be implemented as one unit or as separate units. The control unit 160 can also be integrated in the drive unit 170. In addition, the individual units can be connected to each other. For example, the detection unit 140 can be electrically connected to the processing unit 150. For example, the processing unit 150 can be electrically connected to the control unit 160. For example, the control unit 160 can be electrically connected to the drive unit.

Figure 2:
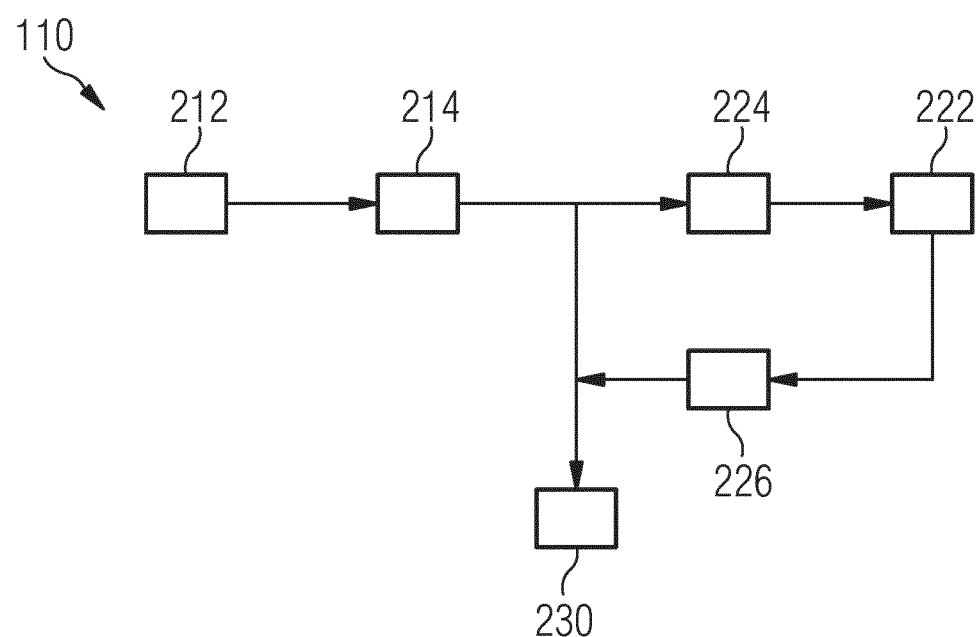
FIG. 2 shows a schematic diagram of an energy supply system of a reconnaissance rover.

FIG. 2 shows a detailed representation of an energy supply system 110 of the reconnaissance rover 100 in accordance with both options. The energy supply system 110 is necessary for supplying power to the reconnaissance rover 100 and represents a constraint in the design of the reconnaissance rover 100.

The energy supply system 110 comprises a solar panel 212 (energy supply device), a power regulator 214 for the solar panel 212, a battery 222 (energy storage device), a battery charge regulator 224, a battery discharge regulator 226 and load(s) 230.

The solar panel 212 can comprise a group of solar panels 212. The power regulator 214 for the solar panel 212 can be a series regulator 214, which maintains the voltage at a voltage supplied by the solar panel 212. The battery 222 can comprise a compact battery arrangement 222, for example comprising lead-acid or lithium batteries. The battery charge regulator 224 is provided to supply the battery with energy which is configured to be provided to the battery by the solar panel 212 via the power regulator 214 for the solar panel 212. The battery discharge regulator 226 is provided to monitor the discharge process of the battery 222 and/or to regulate it in such a way that the battery supplies the necessary supply voltage. This may also be the case when no solar radiation is present and the solar panel 212 is not delivering any current. For example, the entire power supply can be provided by the solar panel 212 when solar radiation is incident on the solar panel 212. The load 230 can be a controller, a processor and/or a drive, for which current is required. In addition, the energy from the solar panel(s) 212 is used to charge the battery 222 via the battery charge regulator 224. To this end it must be ensured that the power does not break down. This is achieved via the power regulator 214.

In accordance with FIGS. 1 and 2 the reconnaissance rover 100 is additionally fitted with actuators and sensors. The actuators are the thrust nozzles required for locomotion. The sensors for preventing collisions and for landing are stereo cameras and panoramic cameras, as well as MEMS sensors and Lidar or altimeters.

Figure 3:
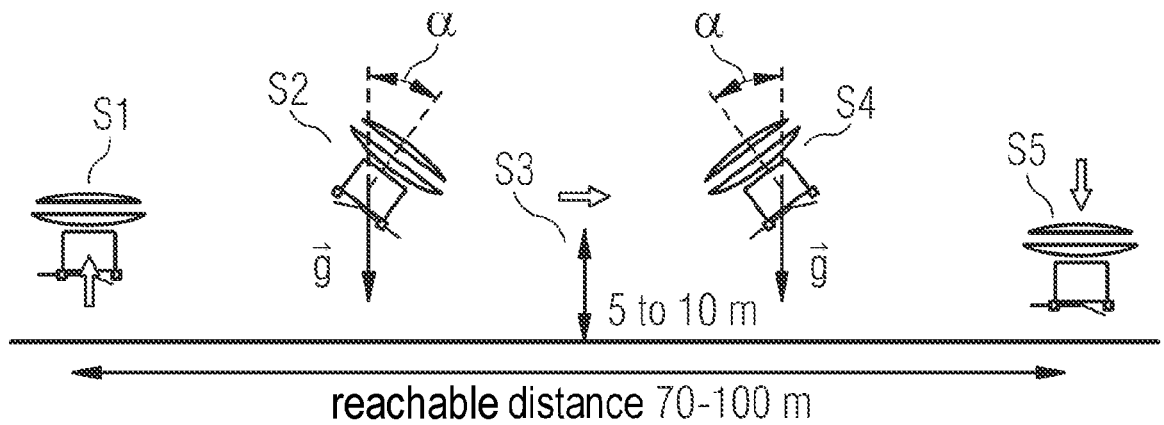
FIG. 3 shows a schematic diagram of a maneuver of a lander on a small body.

FIG. 3 shows a maneuver which is carried out by the reconnaissance rover along a trajectory of a surface of the small body. An example maneuver is illustrated, which comprises the steps S1 to S5: lifting off S1, accelerating S2, hovering S3, decelerating S4 and landing S5. A landing can be secured by appropriate landing pads under the reconnaissance rover. For example, this can be a simple tripod.

Figure 4:
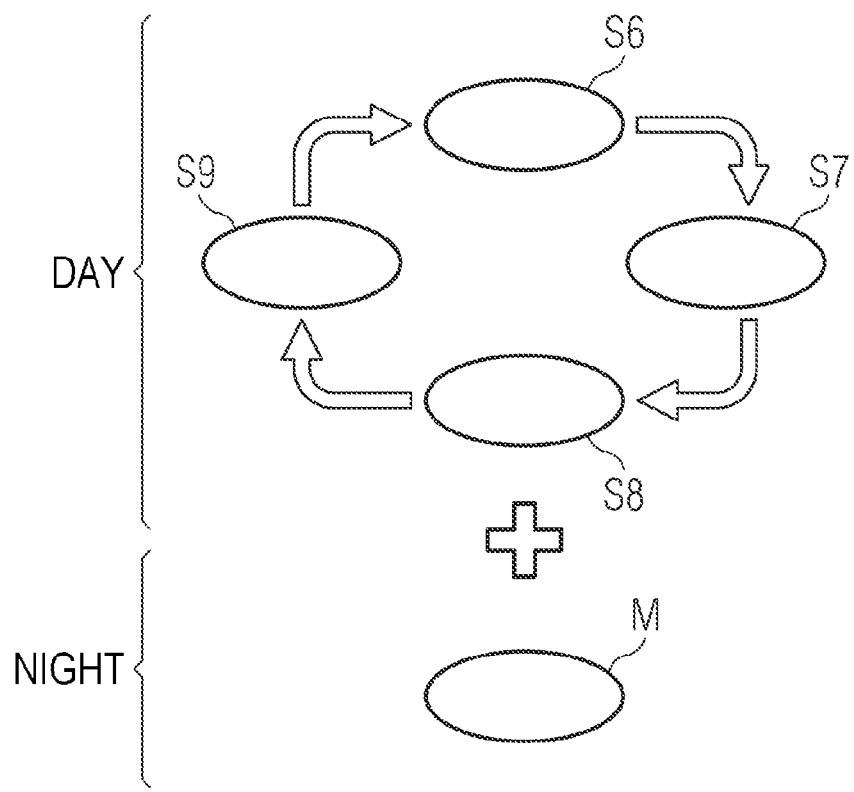
FIG. 4 shows a schematic view of day and night cycle of an operation of a reconnaissance rover.

Since the maneuver cannot continue for an infinite length of time, certain cycles are applied, as in FIG. 4. In this case, during the day, in other words when solar radiation is present, the steps of analysis S6, battery charging S7, hovering S8 and battery re-charging S9 are carried out sequentially. At night, in other words when no solar radiation is present, the reconnaissance rover, or the devices designated for it, goes into an idle mode M in order to save power.

In order that the reconnaissance rover can effectively negotiate external obstacles, it has a motion and orientation controller. For this purpose, the necessary propulsion units (drive unit/drives) are arranged and configured so as to compensate for translational movements and rotational movements. It is crucial here that the forces directed away from the small body that are generated by the propulsion units are greater than the effective gravitational force that the small body exerts on the reconnaissance rover.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reconnaissance rover configured for multiple agile and autonomous landings over a small body or moon, the small body or moon having gravitational forces in terms of an acceleration in a range of $10^{-6}$ and $10^{-4}$ m/s$^2$, the reconnaissance rover comprising:
   a detection unit, which is configured to detect at least an environment in front of the reconnaissance rover, in the direction of a trajectory of the reconnaissance rover over a surface of the small body or moon and to provide environmental data based on the detected environment;
   a processing unit, which is configured to update the trajectory based upon the provided environmental data; and
   a control unit and a drive unit, which are configured to interact in order to move the reconnaissance rover according to the updated trajectory, wherein the drive unit is designed to apply forces which are in a range between 1 N and $10^{-6}$ N, in order to hold the reconnaissance rover in a hovering state above the surface for a period from 1 minute to 1 hour.

2. The reconnaissance rover as claimed in claim 1, wherein the drive unit is also configured to be operated in a vacuum.

3. The reconnaissance rover as claimed in claim 1, wherein the updated trajectory is a polygonal chain and the reconnaissance rover is configured to perform a rotation in a horizontal plane of the reconnaissance rover at one point in the polygonal chain, in order to align itself according to the polygonal path following the point and to move along the polygonal path following the point after the rotation.

4. The reconnaissance rover as claimed in claim 1, wherein the drive unit is additionally configured to adjust a speed of the reconnaissance rover relative to the small body or moon, to move the reconnaissance rover along the updated trajectory, a solar pressure of a sun being taken into account when adjusting the speed.

5. The reconnaissance rover as claimed in claim 1, wherein the detection unit is also configured to detect a relative distance of a current position of the reconnaissance rover with respect to the surface of the small body or moon and to provide said distance to the processing unit, which in turn is configured to provide the control unit with a target speed corresponding to the relative distance, the control unit being configured to interact with the drive unit to move the reconnaissance rover according to the updated trajectory.

6. The reconnaissance rover as claimed in claim 1, also comprising an acceleration sensor which is configured to measure an acceleration of the reconnaissance rover, the processing unit being configured to provide the control unit with a speed necessary for tracking the updated trajectory based on the measured acceleration.

7. The reconnaissance rover as claimed in claim 1, wherein the processing unit is configured, based on a gravitational force module of the small body or moon, when updating the trajectory to take into account at least one of a maximum velocity relative to the small body or moon, which the reconnaissance rover must not exceed, or a minimum velocity which it must not fall below.

8. The reconnaissance rover as claimed in claim 1, wherein the processing unit is configured, when updating the trajectory, to take into account that along the trajectory only torque values of less than 10-2 Nm occur in a direction facing towards or away from a center of gravity of the small body or moon.

9. The reconnaissance rover as claimed in claim 1, the reconnaissance rover comprising an energy supply system, and wherein the energy supply system has an energy storage device and an energy supply device, the energy supply system being configured to supply the drive unit with energy.

10. The reconnaissance rover as claimed in claim 9, wherein the energy supply device is configured to supply the energy storage device and the drive unit with energy when solar radiation from a sun is present.

11. The reconnaissance rover as claimed in claim 9, wherein the energy storage device is configured to supply the drive unit with energy in case no solar radiation from a sun is present.

12. The reconnaissance rover as claimed in claim 9, wherein the energy storage device, together with the energy supply device, is configured to supply the drive unit with energy when a supply voltage delivered by the energy supply device falls below a threshold value, the threshold value being a minimum supply voltage of the drive unit.

13. The reconnaissance rover as claimed in claim 9, wherein the processing unit is configured, when updating the trajectory, to take into account a landing position for the reconnaissance rover at the end of the updated trajectory or a landing position for the reconnaissance rover being below the updated trajectory on a surface of the small body or moon has a line-of-sight connection to a sun, in order to supply the energy supply device with energy by radiation from the sun.

14. The reconnaissance rover as claimed in claim 9, wherein at least one of the energy supply device is configured to supply the energy storage device with energy, or the energy storage device is configured to be supplied with energy from the energy supply device.

15. The reconnaissance rover as claimed in claim 9, wherein the energy supply system has only unidirectional electrical connections.

16. A reconnaissance rover configured for multiple agile and autonomous landings over a small body or moon, the small body or moon having gravitational forces in terms of an acceleration in a range of $10^{-6}$ and $10^{-4}$ m/s$^2$, the reconnaissance rover comprising:
   a detector configured to detect at least an environment in front of the reconnaissance rover, in the direction of a trajectory of the reconnaissance rover over a surface of the small body or moon and to provide environmental data based on the detected environment;
   a processor configured to update the trajectory based upon the provided environmental data; and
a controller and a driver, which are configured to interact in order to move the reconnaissance rover according to the updated trajectory, wherein the drive unit is designed to apply forces which are in a range between 1 N and $10^{-6}$ N, in order to hold the reconnaissance rover in a hovering state above the surface for a period from 1 minute to 1 hour.

* * * * *